United States Patent
Song et al.

(10) Patent No.: US 10,006,771 B2
(45) Date of Patent: Jun. 26, 2018

(54) METHOD AND DEVICE FOR CONVERTING SHIP INFORMATION

(71) Applicant: Electronics and Telecommunications Research Institute, Daejeon (KR)

(72) Inventors: Moon Sub Song, Daejeon (KR); Kwang Il Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 180 days.

(21) Appl. No.: 15/221,760

(22) Filed: Jul. 28, 2016

(65) Prior Publication Data
US 2017/0039184 A1    Feb. 9, 2017

(30) Foreign Application Priority Data
Aug. 5, 2015  (KR) .......................... 10-2015-0110668

(51) Int. Cl.
*H04L 29/06* (2006.01)
*G01C 21/20* (2006.01)
*G06F 17/30* (2006.01)

(52) U.S. Cl.
CPC ....... *G01C 21/203* (2013.01); *G06F 17/3092* (2013.01); *G06F 17/30914* (2013.01)

(58) Field of Classification Search
CPC . H04L 29/06; G06F 17/2785; G06F 17/2765; G01C 21/20
See application file for complete search history.

(56) References Cited

U.S. PATENT DOCUMENTS

2007/0226769 A1* 9/2007 Waki ..................... G09G 5/006
                                                         725/127
2011/0035067 A1* 2/2011 Larsson ................ H02J 3/005
                                                         700/286

(Continued)

FOREIGN PATENT DOCUMENTS

KR   10-2007-0049464   5/2007
KR       10-1040357    6/2011

OTHER PUBLICATIONS

International Electrotechnical Commission (IEC), "Maritime Navigation and radiocommunication Equipment and Systems—Digital Interface—Part 1: Single talker and Multiple listeners", IEC International Standard; IEC 61162-1, Nov. 2010, pp. 1-154.

(Continued)

*Primary Examiner* — Andrew Lee
(74) *Attorney, Agent, or Firm* — Kile Park Reed & Houtteman PLLC

(57) ABSTRACT

Provided is a ship information conversion method. The ship information conversion method includes receiving an international electrotechnical commission (IEC) 61162-based sentence prescribed by IEC, analyzing an address field and a data field of the IEC 61162-based sentence, extracting an information type object, an attribute type, a data type object, and an enumerated data type object from the IEC 61162-based sentence by using a result of the analysis, and converting the IEC 61162-based sentence into a common maritime data structure (CMDS) which includes the extracted information type object, attribute type, data type object, and enumerated data type object.

15 Claims, 16 Drawing Sheets

(56) References Cited

U.S. PATENT DOCUMENTS

| | | | |
|---|---|---|---|
| 2012/0084400 A1* | 4/2012 | Almadi | H04L 41/069 709/219 |
| 2012/0300777 A1* | 11/2012 | Chandrasekaran | H04L 12/4625 370/392 |
| 2013/0055389 A1* | 2/2013 | Alvarez | H04L 41/28 726/22 |
| 2013/0111284 A1* | 5/2013 | English | G06F 11/0739 714/724 |
| 2013/0148522 A1 | 6/2013 | Park et al. | |
| 2014/0160998 A1 | 6/2014 | Park et al. | |
| 2014/0258802 A1* | 9/2014 | Randhawa | H04L 1/0078 714/752 |
| 2015/0172424 A1* | 6/2015 | Sone | H04W 4/70 370/401 |
| 2015/0326350 A1* | 11/2015 | Macikunas | G01S 5/0027 714/776 |
| 2016/0373274 A1* | 12/2016 | Sivanthi | H04L 12/4625 |
| 2017/0116072 A1* | 4/2017 | Lee | G06F 11/0793 |

OTHER PUBLICATIONS

International Hydrographic Organization, "S-100 Universal Hydrographic Data Model", International Hydrographic Bureau, Jan. 2010, pp. 1-329.

\* cited by examiner

FIG. 2

<<enumeration>>
PS_ModeIndicator

A
D
E
M
S
N

GLL latitudeNS: Iec_LatitudeNS
longitudeEW: Iec_longitudeEW
utcOfPosition: Time
dataValid: Boolean
modeIndicator: PS_ModeIndicator

FIG. 3

| | Field Type | Symbol |
|---|---|---|
| Special format fields | Status | A |
| | Latitude | llll.ll |
| | Longitude | yyyyy.yy |
| | Time | hhmmss.ss |
| | Defined field | |
| Numeric value fields | Variable numbers | x.x |
| | Fixed HEX field | hh- |
| | Variable HEX field | h- -h |
| | Fixed six-bit field | ss_ _ _ |
| | Variable six-bit field | s- -s |
| Information fields | Variable text | c- -c |
| | Fixed alpha field | aa- |
| | Fixed number field | xx- |
| | Fixed text field | cc- |

FIG. 4

| Data Types | |
|---|---|
| Integer | Primitive Types |
| PositiveInteger | |
| NonNegativeInteger | |
| Real | |
| Boolean | |
| CharacterString | |
| Date | |
| Time | |
| Date Time | |
| TruncatedDate | |
| UnlimtedInteger | Complex Types |
| Matrix | |
| Multiplicity | |
| NumericRange | |
| UnitOfMeasure | |
| Measure | |
| Length | |
| Angle | |
| IndeterminatedDate | |

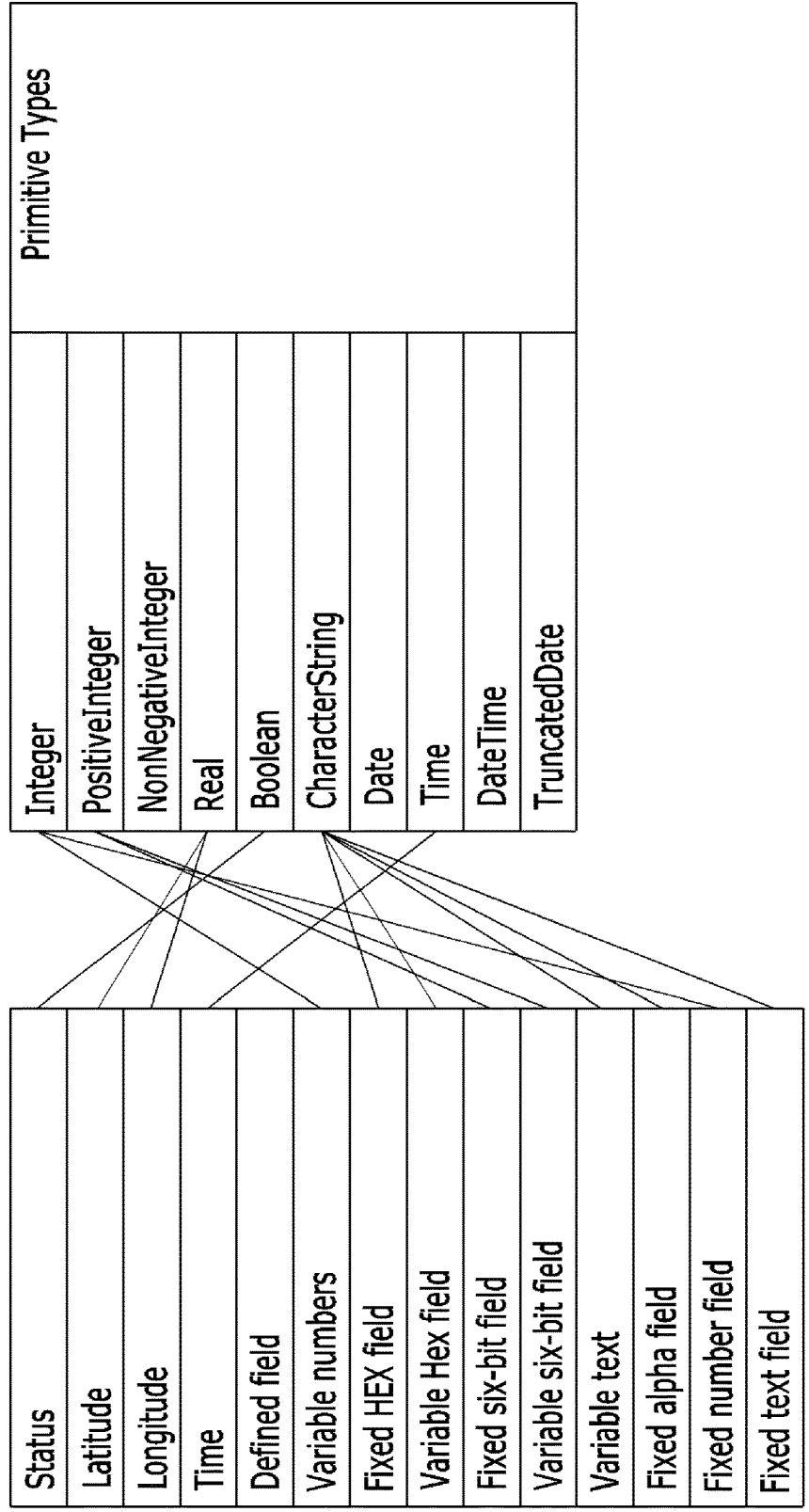
FIG. 6   Field Types

FIG. 7

| Data Field (#) | Tag (Attribute Name Candidate) | Symbol | Field type | Range of value | meaning of Type |
|---|---|---|---|---|---|
| 1 | Wind angle | x.x | Variable numbers | 0° to 359° | |
| 2 | Reference | a | Character symbol | R/T | R = relative, T = true |
| 3 | Wind speed | x.x | Variable numbers | | |
| 4 | Wind speed units | a | Alphabet character Variable | K/M/N | K = km/h; M = m/s; N = Knots |
| 5 | status | A | Status | A/V | A = data valid V= data invalid |

| Attribute Name | Attribute Type |
|---|---|
| iec_WindAngle | Angle |
| iec_WindReference | CharacterString(or Enumeration) |
| iec_WindSpeed | Integer or Real |
| iec_WindSpeedUnits | UnitOfMeasure(or Enumeration) |
| iec_DataStatus | Booleans |

FIG. 8

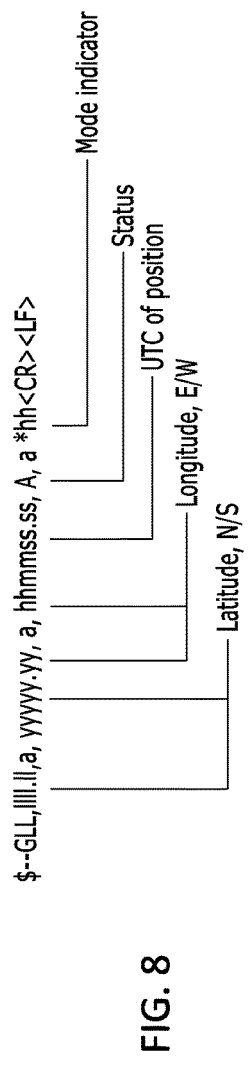

$--GLL,llll.ll,a, yyyyy.yy, a, hhmmss.ss, A, a *hh<CR><LF>
- Latitude, N/S
- Longitude, E/W
- UTC of position
- Status
- Mode indicator

| Role Name | Name | Description | Multiplicity | Data Type | Remarks |
|---|---|---|---|---|---|
| Class | GLL | | - | | |
| Attribute | iec_LatitudeNS | | 1 | IEC_LatitudeNS | |
| Attribute | iec_LongitudeEW | | 1 | IEC_LongitudeEW | |
| Attribute | utcOfPosion | | 1 | Time | |
| Attribute | dataStatus | | 1 | Booleans | Not null |
| Attribute | modeIndicator | | 1 | PS_ModeIndicator | Not null |

| Role Name | Name | Description | Remarks |
|---|---|---|---|
| Enumeration | PS_ModeIndicator | | Positioning system mode indicator |
| Literal | A | Autonomous | |
| Literal | D | Differential | |
| Literal | E | Estimated(dead reckoning) | |
| Literal | M | Manual input | |
| Literal | S | Simulator | |
| Literal | N | Data not valid | |

FIG. 10A

| Role Name | Name | Description | Multiplicity | Data Type | Remarks |
|---|---|---|---|---|---|
| Class | AAM | | - | | |
| Attribute | arrivalCircleEntered | | 1 | Boolean | |
| Attribute | perpendicularPassed | | 1 | Boolean | |
| Attribute | arrivalCircleRadius | | 1 | IEC_Measure | |
| Attribute | unitOfRadius | | 1 | IEC_UnitOfMeasure | |
| Attribute | waypointID | | 1 | CharacterString | |

FIG. 10B

| Role Name | Name | Description | Multiplicity | Data Type | Remarks |
|---|---|---|---|---|---|
| Class | IEC_UnitOfMeasure | | | | |
| Attribute | name | | 1 | CharacterString | |
| Attribute | definition | | 0..1 | CharacterString | |
| Attribute | symbol | | 1 | Character | |

FIG. 10C

| Role Name | Name | Description | Multiplicity | Data Type | Remarks |
|---|---|---|---|---|---|
| Class | IEC_Measure | | | | |
| Attribute | value | | 1 | Real | |

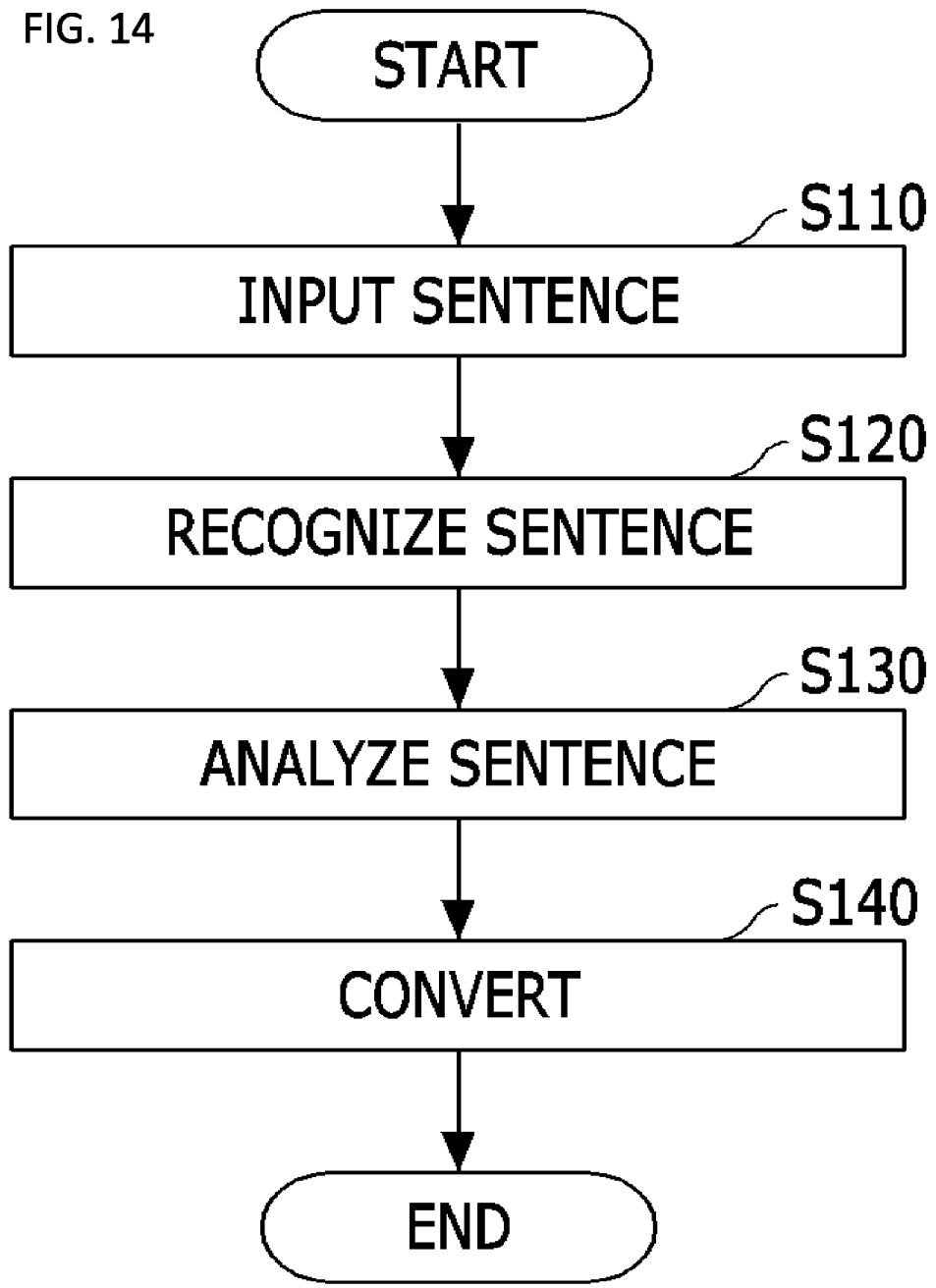

METHOD AND DEVICE FOR CONVERTING SHIP INFORMATION

CROSS-REFERENCE TO RELATED APPLICATIONS

This application claims priority under 35 U.S.C. § 119 to Korean Patent Application No. 10-2015-0110668, filed on Aug. 5, 2015, the disclosure of which is incorporated herein by reference in its entirety.

TECHNICAL FIELD

The present invention relates to a method and device for converting ship information, and more particularly, to a method and device for converting ship information related to maritime navigation and radio communication, which enable different ship sailing devices to share, integrate, and exchange ship information.

BACKGROUND

International maritime organization (IMO) is developing a common maritime data structure (CMDS) for sharing, integrating, and exchanging information between devices, between a device and a service, and between services on ships and the land, for establishing e-Navigation. International electrotechnical commission (IEC) is developing the new standard for integrating the conventional ship sailing device interface standards.

In order to establish the e-Navigation, it is required to develop a common standardized interface for transferring information, obtained from a variety of different ship sailing devices equipped in a ship, to the land. Also, it is required to develop a common interface for processing and transmitting various pieces of information about the land to a ship sailing device of a ship which is sailing.

However, ship sailing devices which are equipped in ships at present are based on IEC 61162 standard which is a digital interface prescribed by the IEC.

Therefore, in order to implement the e-Navigation, it is required to convert ship information into the CMDS which is applied to conventional ship sailing devices and enables the ship sailing devices to share, integrate, and exchange the ship information.

SUMMARY

Accordingly, the present invention provides a method and device for converting ship information, which convert an IEC 61162-based digital interface, equipped in ships at present, into a CMDS to enable information to be shared, integrated, and exchanged between devices, between a device and a service, and between services on the ships and the land.

In one general aspect, a ship information conversion method includes: receiving an international electrotechnical commission (IEC) 61162-based sentence prescribed by IEC; analyzing an address field and a data field of the IEC 61162-based sentence; and extracting an information type object, an attribute type, a data type object, and an enumerated data type object from the IEC 61162-based sentence and converting the IEC 61162-based sentence into a common maritime data structure (CMDS) by using a result of the analysis which is performed in step (B), the CMDS including the extracted information type object, attribute type, data type object, and enumerated data type object.

In another general aspect, a ship information conversion device includes: an input unit configured to receive an international electrotechnical commission (IEC) 61162-based sentence prescribed by IEC; an analyzer configured to analyze an address field and a data field of the IEC 61162-based sentence; and a converter configured to extract an information type object, an attribute type, a data type object, and an enumerated data type object from the IEC 61162-based sentence and convert the IEC 61162-based sentence into a common maritime data structure (CMDS) by using a result of the analysis by the analyzer, the CMDS including the extracted information type object, attribute type, data type object, and enumerated data type object.

Other features and aspects will be apparent from the following detailed description, the drawings, and the claims.

BRIEF DESCRIPTION OF THE DRAWINGS

FIG. 2 is a diagram a structure of a CMDS.

FIG. 3 is a diagram illustrating an IEC 61162-based field type.

FIG. 4 is a diagram illustrating a data type of the CMDS.

FIG. 6 is a diagram schematically illustrating a process of converting IEC 61162-based field types and CMDS-based data types, according to an embodiment of the present invention.

FIG. 7 is a diagram schematically illustrating a process of converting IEC 61162-based field types and CMDS-based data types, according to another embodiment of the present invention.

FIG. 8 is a diagram for describing a process of converting an IEC 61162-based geographic position-latitude/longitude (GLL) sentence into the CMDS, according to an embodiment of the present invention.

FIGS. 9 and 10A to 10C are diagrams for describing a process of converting an IEC 61162-based waypoint arrival alarm (AAM) sentence into the CMDS, according to another embodiment of the present invention.

FIG. 14 is a flowchart of a ship information conversion method according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
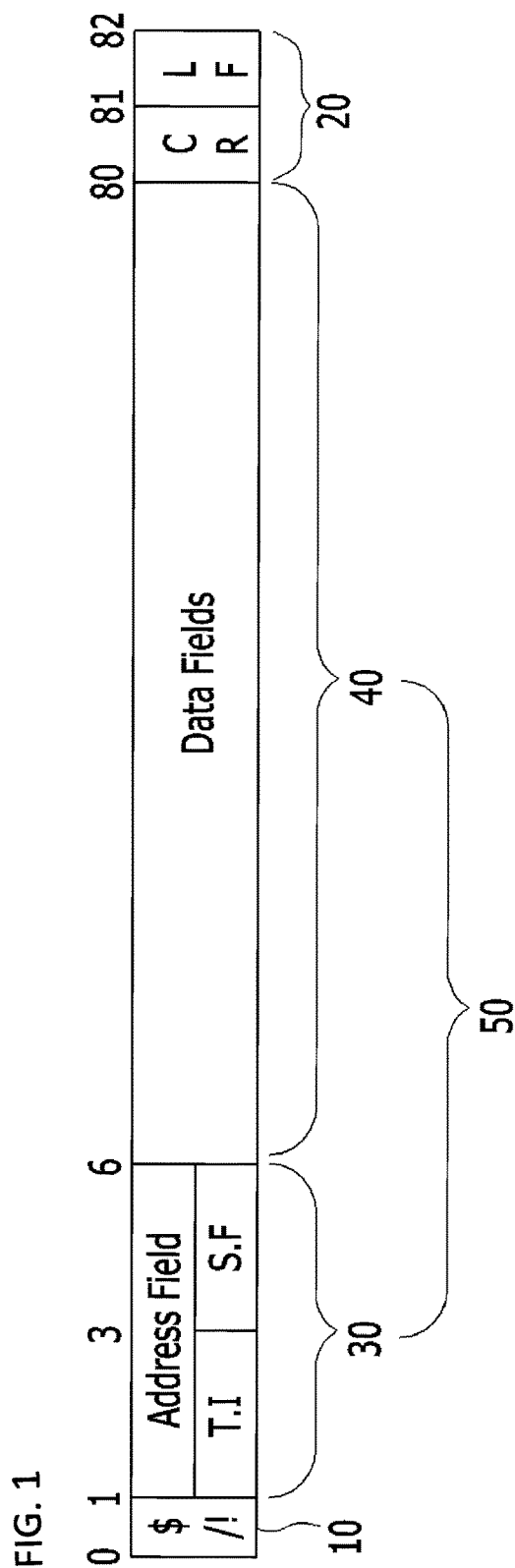
FIG. 1 is a diagram illustrating an IEC 61162-based sentence structure.

FIG. 1 is a diagram illustrating an IEC 61162-based sentence structure.

Referring to FIG. 1, an IEC 61162-based message may be configured in an ASCII format. In the IEC 61162-based message, a material including a maximum of 82 characters may be transmitted at a time.

The IEC 61162-based message may be configured in a sentence form which includes delimiters 10 and 20 and a field 50.

The delimiter 10 and 20 may include a start delimiter 10 and an end delimiter 20 which delimits a start and an end of a sentence. $ or ! may be a symbol that designates the start delimiter 10, and <CR> <LF> may be a symbol that designates the end delimiter 20. Here, CR may be an abbreviation for Carriage Return, and LF may be an abbreviation for Line Feed.

The field 50 may include an address field 30 and data fields 40. Here, the address field 30 may include a talker identifier (T.I) and a sentence formatter (S.F). T.I may be an identifier for identifying a talker, and S.F may be an identifier for identifying a format of a sentence. The identifiers may each include three characters like geographic position-latitude/longitude (GLL), time and date (ZDA), GPS fix data (GGA), GNSS DOP and active satellites (GSA), course over ground (VTG), wind speed angle (MWV), and waypoint arrival alarm (AAM).

On the other hand, as illustrated in FIG. 2, a common maritime data structure (CMDS) may be expressed in an object-oriented form.

That is, the CMDS may include GLL, which is a sentence formatter of an IEC 61162-based GLL sentence, and data fields in which semantic information of a sentence corresponds to class name. Here, the data fields may be expressed in an object form including attributes such as latitudeNS, longitudeEW, utcOfPosition, dataValid, and modeIndicator, and the attributes may be expressed as latitudeNS (Iec_LatitudeNS), longitudeEW (Iec_longitudeEW), utcOfPosition (Time), dataValid (Boolean), and modeIndicator (PS_ModeIndicator).

Moreover, in the IEC 61162-based GLL sentence, the modeIndicator (PS_ModeIndicator) may include indicators consisting of A (Autonomous), D (Differential), E (Estimated), M (Manual input), S (Simulator), and N (Data not valid). In converting the modeIndicator into the CMDS, an attribute of the modeIndicator may have a data type which is the same as that of the PS_ModeIndicator, and the indicators may have a structure where A, D, E, M, S, and N are configured as one object. Here, a data type "PS_ModeIndicator" may correspond to class of an enumerated value type consisting of only the indicators "A", "D", "E", "M", "S", and "N".

A data type expressing an attribute of the CMDS may include a new data type defined based on a value of the attribute, in addition to a basic data type.

Moreover, the IEC 61162 and the CMDS illustrated in FIGS. 1 and 2 may have a difference in data type without having a difference in expression method.

Figure 5:
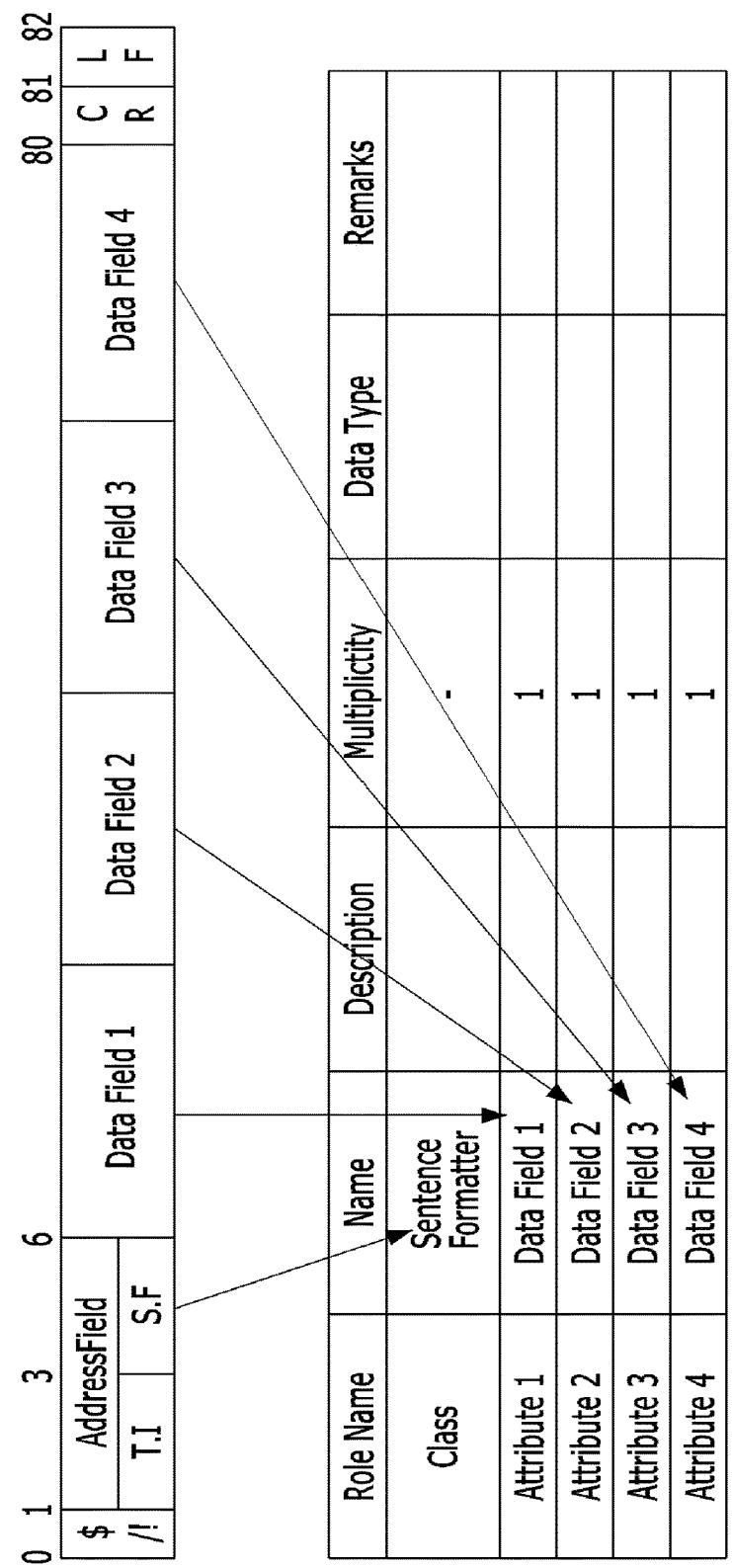
FIG. 5 is a diagram schematically illustrating a process of converting an IEC 61162-based sentence structure into a CMDS-based object structure, according to an embodiment of the present invention.

An IEC 61162-based field type is illustrated in FIG. 3, and a data type of the CMDS is illustrated in FIG. 5.

The IEC 61162-based field type illustrated in FIG. 3 may be a format of a data field type where a format of a sentence is GLL, and may include Special format fields, Numeric value fields, and Information fields.

The special format fields may include status expressed as a symbol 'A(data valid)', latitude expressed as a symbol 'llll.ll', longitude expressed as a symbol 'yyyyy.yy', time (universal time coordinated time (UTC time)) expressed as a symbol 'hhmmss.ss', and defined field which is not defined. The numeric value fields may include variable numbers field expressed as a symbol 'x.x', fixed HEX field expressed as a symbol 'hh-', variable HEX field expressed as a symbol 'h- -h', fixed six-bit field expressed as a symbol 'ss_____', and variable six-bit field expressed as a symbol 's- -s'. The information fields may include variable text expressed as a symbol 'c- -c', fixed alpha field expressed as a symbol 'aa-', fixed number field expressed as a symbol 'xx-', and fixed text field expressed as a symbol 'cc-'.

Data types of the CMDS corresponding to the IEC 61162-based field type may include primitive type and complex types. The primitive types may include Integer type, PositiveInteger type, NonNegativeInteger type, Real type, Boolean type, CharacterString type, Date type, Time type, Datetime type, and Truncateddate type. The complex types may include UnlimitedInteger type, Matrix type, Multiplicity type, NumericRange type, UnitOfMeasure type, Measure type, Length type, Angle type, and IndeterminatedDate type.

As described above, an IEC 61162-based message and a CMDS-based message may have different data types.

Therefore, in order for a CMDS-based system to share message transmitted from an IEC 61162-based system, an IEC 61162-based sentence structure should be converted into a CMDS-based object structure, and an IEC 61162-based filed type should be converted into a CMDS-based data type.

FIG. 5 is a diagram schematically illustrating a process of converting an IEC 61162-based sentence structure into a CMDS-based object structure, according to an embodiment of the present invention and illustrates conversion between a CMDS-based object structure and an IEC 61162-based sentence structure having four data fields 1 to 4.

As illustrated in FIG. 5, an IEC 61162-based sentence formatter (S.F) may be converted into class name of the CMDS, and the fourth data fields may be converted into attributes 1 to 4 of class.

FIG. 6 is a diagram schematically illustrating a process of converting IEC 61162-based field types and CMDS-based data types, according to an embodiment of the present invention and illustrates conversion between primitive types among CMDS-based data types and IEC 61162-based field types.

Referring to FIG. 6, status of IEC 61162 may be converted into Boolean of the CMDS, latitude and longitude of IEC 61162 may be converted into real of the CMDS, time of IEC 61162 may be converted into time of the CMDS, variable numbers of IEC 61162 may be converted into integer of the CMDS, fixed six-bit field and variable six-bit field of IEC 61162 may be converted into PositiveInteger of the CMDS, and fixed number field of IEC 61162 may be converted into integer of the CMDS.

Moreover, fixed HEX field of IEC 61162, variable HEX field of IEC 61162, variable text of IEC 61162, fixed alpha field of IEC 61162, and fixed text field of IEC 61162 may be converted into CharacterString of the CMDS.

Examples of conversion illustrated in FIGS. 5 and 6 may be variously modified according to a format of an IEC 61162-based sentence. As another example, when a field type is wind angle (data field) which are variable numbers, according to the conversion example of FIG. 6, a field type may be converted into integer type of the CMDS. However, in the wind angle, a range of a value thereof may be 0 degrees to 359 degrees, and thus, a field type may be converted into angle type among the complex types of the DMCS illustrated in FIG. 4.

FIG. 8 is a diagram for describing a process of converting an IEC 61162-based geographic position-latitude/longitude (GLL) sentence into the CMDS, according to an embodiment of the present invention.

Referring to FIG. 8, in an IEC 61162-based GLL sentence, GLL indicating a format of a sentence may be converted into name of class defined in the CMDS.

Latitude N/S corresponding to a symbol "llll.ll (alphabet l)" may be name of attribute defined in the CMDS and may be converted into iec_Latitude N/S, and the iec_Latitude N/S may be recorded as iec_Latitude N/S in data type items defined in the CMDS.

Longitude E/W corresponding to a symbol "yyyyy.yy" may be name of attribute defined in the CMDS and may be converted into iec_Longitude E/W, and the iec_Longitude E/W may be recorded as IEC_Latitude N/S in data types defined in the CMDS.

UTC corresponding to a symbol "hhmmss.ss" may be name of attribute defined in the CMDS and may be converted into utcOfPosition, and the utcOfPosition may be recorded as time in data types defined in the CMDS.

Status corresponding to a symbol "A" may be name of attribute defined in the CMDS and may be converted into dataStatus, and the dataStatus may be recorded as Booleans in data types defined in the CMDS.

Mode indicator corresponding to a symbol "a" may be name of attribute defined in the CMDS and may be converted into modeIndicator, and the modeIndicator may be recorded as PS_ModeIndicator in data types defined in the CMDS.

Here, the modeIndicator may be converted into name of enumeration defined in the CMDS, and indicators "A", "D", "E", "M", "S", and "N" of the modeIndicator may each be converted into name of literal defined in the CMDS.

Figure 9:
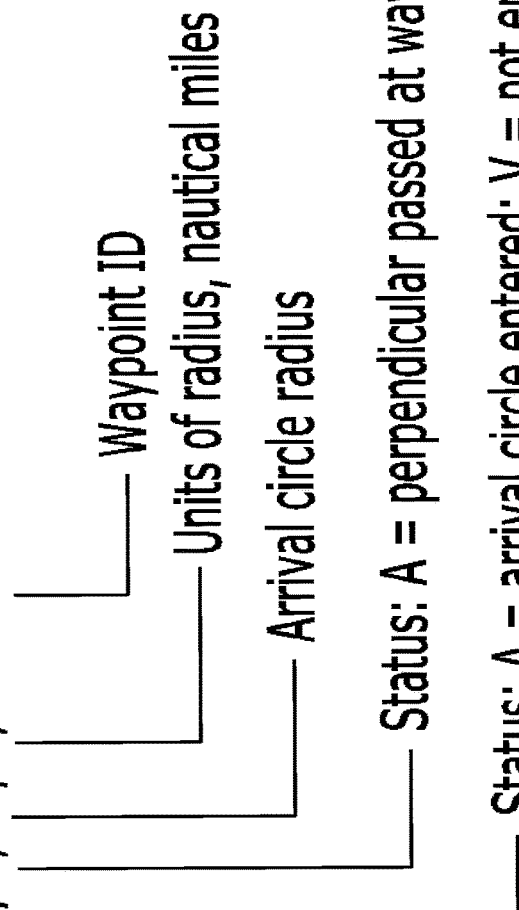

FIGS. 9 and 10 are diagrams for describing a process of converting an IEC 61162-based waypoint arrival alarm (AAM) sentence into the CMDS, according to another embodiment of the present invention.

Referring to FIG. 9, an IEC 61162-based AAM sentence may have status information of when a ship arrives at a point "waypoint c-c".

In the IEC 61162-based AAM sentence, a symbol "A" subsequent to a sentence formatter (S.F) may denote status. Here, the status may be expressed as a symbol "A" or "V", A may denote "arrival circle entered", and V may denote "not entered". Another symbol "A" subsequent to the symbol "A" may denote another status. Here, the other status may be expressed as a symbol "A" or "V", A may denote "perpendicular passed at waypoint", and V may denote "not passed". A symbol "x.x" subsequent to the other symbol "A" may denote "Arrival circle radius". A symbol "N" subsequent to the symbol "x.x" may denote "Units of radius" and "nautical miles". A symbol "c--c*hh<CR> <LF>" subsequent to the symbol "x.x" may denote "Waypoint ID".

The IEC 61162-based AAM sentence, as illustrated in FIG. 10, may be converted into one information type (AAM Class) and two complex types (IEC UnitOfMeasure, IEC_Measure). In FIG. 10A, a table A may show the information type (AAM Class), and tables B and C may show the two complex types (IEC UnitOfMeasure, IEC Measure).

In the IEC 61162-based AAM sentence, "Arrival circle radius" and "Units of radius" may be data types undefined in the CMDS and may be converted into two complex types as shown in the tables B and C.

"Units of radius" undefined in the CMDS, as shown in the table B of FIG. 10B, may be converted into IEC_UnitOfMeasure which is name of class defined in the CMDS, and name, definition, and symbol of "Units of radius" may respectively be converted into attributes of the class.

"Arrival circle radius" undefined in the CMDS, as shown in the table C of FIG. 10C, may be converted into IEC_Measure which is name of class defined in the CMDS, and a value of "Arrival circle radius"may respectively be converted into an attribute of the class.

Figure 11:
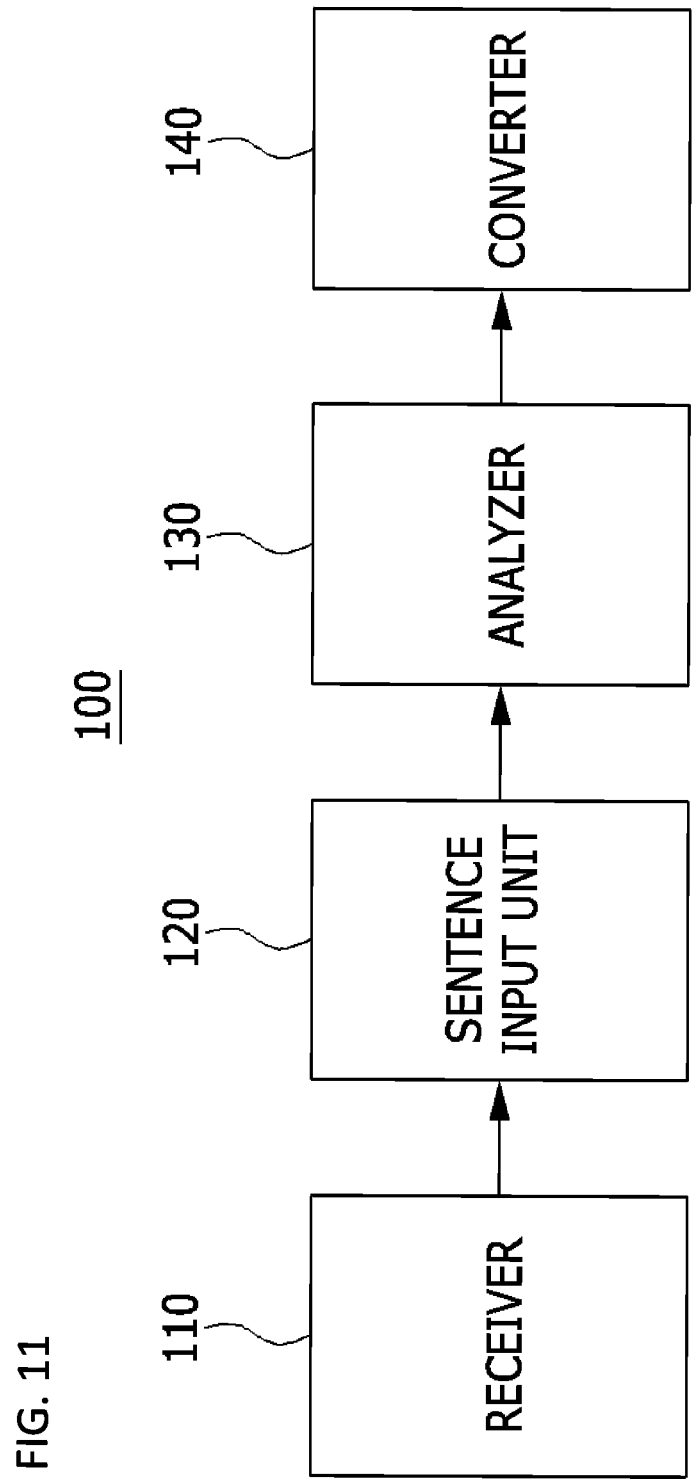
FIG. 11 is a block diagram of a ship information conversion device for converting an IEC 61162-based sentence into the CMDS, according to an embodiment of the present invention.

FIG. 11 is a block diagram of a ship information conversion device 100 for converting an IEC 61162-based sentence into the CMDS, according to an embodiment of the present invention.

Referring to FIG. 11, the ship information conversion device 100 may be equipped in a ship's integration system or a land management system. The ship information conversion device 100 may include a receiver 110, a sentence input unit 120, an analyzer 130, and a converter 140. The sentence input unit 120, the analyzer 130, and the converter 140 may be integrated into one decoder.

The receiver 110 may receive an IEC 61162-based marine signal transmitted from another communication device installed on the land or a communication device installed in another ship which is sailing.

The sentence input unit 120 may extract an IEC 61162-based sentence from the marine signal and output the extracted IEC 61162-based sentence. The IEC 61162-based sentence may have the following form:

$P . . . *hh<CR> <LF> where "$" denotes a start of a sentence, "P" denotes a sentence formatter (S.F) or a user definition data format, ". . . " denotes data, "*" denotes checksum, "hh" denotes a checksum value, <CR> denotes 0x0d, and <LF>denotes 0x0a.

The analyzer 130 may analyze the IEC 61162-based sentence output from the sentence input unit 120 with reference to a table (not shown) which defines a coupling relationship or an association between at least two of a sentence format (S.F) defined in the IEC 61162-based sentence, a type of a data field, tag information tagged to the data field, a symbol, and semantic information thereof and may transfer a result of the analysis to the converter 140. This will be described below in detail with reference to FIG. 12.

The converter 140 may be an element that converts the IEC 61162-based sentence into a CMDS. The converter 140 may classify the analysis result transferred from the analyzer 130 into an information type, an attribute type, and a data type with reference to a predetermined converting rule and may establish the CMDS where the classified information type, attribute type, and data type are provided as objects. This will be described below in detail with reference to FIG. 13.

Figure 12:
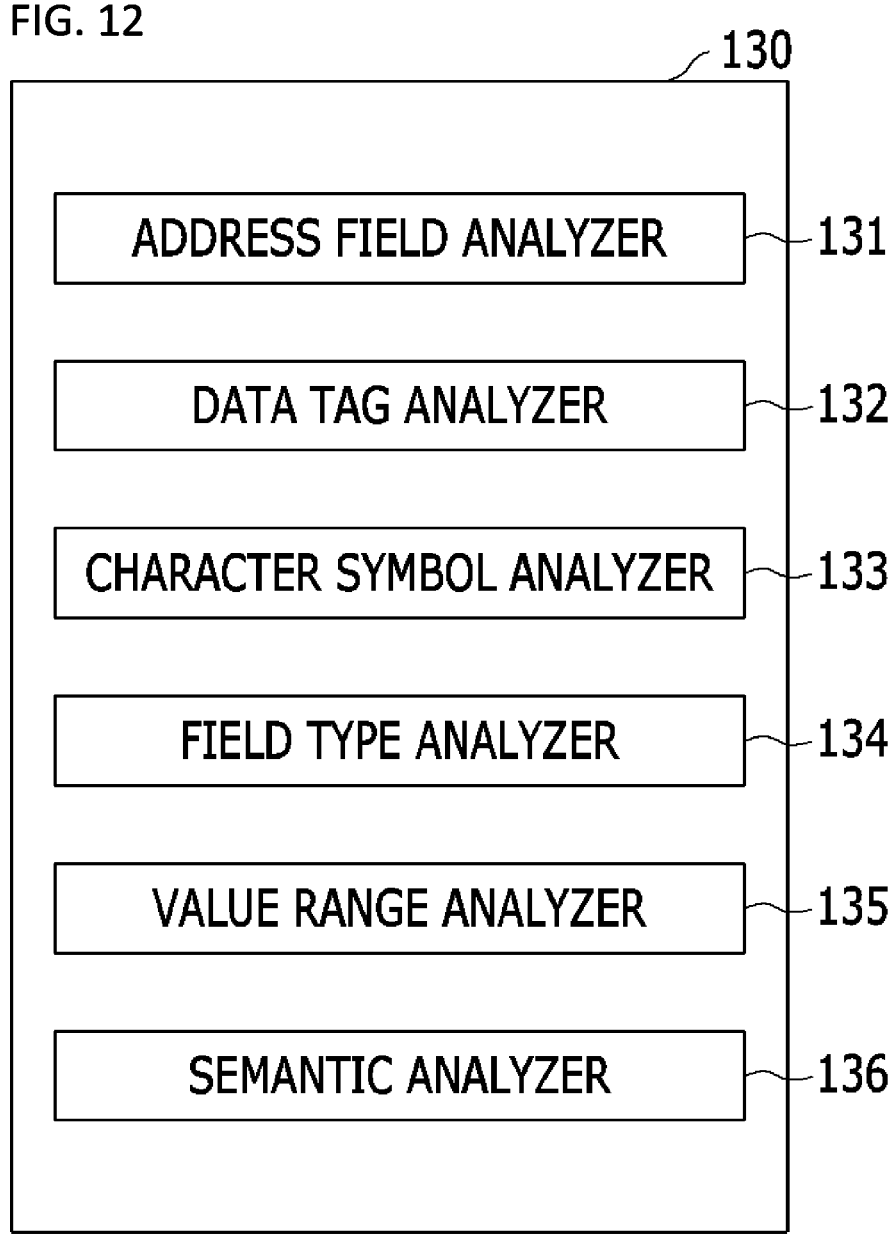
FIG. 12 is a block diagram schematically illustrating an internal configuration of an analyzer illustrated in FIG. 11.

FIG. 12 is a block diagram schematically illustrating an internal configuration of the analyzer 130 illustrated in FIG. 11.

Referring to FIG. 12, the analyzer 130 may include an address field analyzer 131, a data tag analyzer 132, a character symbol analyzer 133, a field type analyzer 134, a value range analyzer 135, and a semantic analyzer 136, for analyzing the IEC 61162-based sentence input from the sentence input unit 120.

The address field analyzer 131 may analyze an address field (30 of FIG. 1) of the IEC 61162-based sentence input from the sentence input unit 120. In detail, the address field analyzer 131 may analyze the sentence format (S.F) of the address field. Here, the sentence format (S.F) may include geographic position-latitude/longitude (GLL), time and date (ZDA), GPS fix data (GGA), GNSS DOP and active satellites (GSA), course over ground (VTG), wind speed angle (MWV), and waypoint arrival alarm (AAM), but is not limited thereto. The sentence format (S.F) may include all sentences approved by the IEC.

The data tag analyzer 132 analyze the tag information tagged to data fields of the IEC 61162-based sentence input from the sentence input unit 120 with reference to the table. Tag information tagged to data fields of the IEC 61162-based wind speed and angle (MWV) sentence may include "Wind angle", "Reference", "Wind speed", "Wind speed units", and "Status". Tag information tagged to data fields of the IEC 61162-based GLL sentence may include "Latitude N/S", "Longitude E/W", "UTC(Universal Time Coordinated)", and "Status, Mode indicator". Tag information tagged to data fields of the IEC 61162-based AAM sentence may include "Status", "Arrival circle radius", "Units of radius", and "Waypoint ID".

The symbol analyzer 133 may analyze a symbol character defined in the IEC 61162-based sentence input from the sentence input unit 120 with reference to the table.

The field type analyzer 134 may analyze type information of data fields defined in the IEC 61162-based sentence input from the sentence input unit 120 with reference to the table.

The value range analyzer 135 may analyze a range of a value recorded in each of the data fields defined in the IEC 61162-based sentence input from the sentence input unit 120 with reference to the table.

The semantic analyzer 136 may analyze semantic information of the sentence format (30 of FIG. 1) analyzed by the address field analyzer 131, semantic information of the tag information analyzed by the data tag analyzer 132, semantic information of the symbol analyzed by the symbol analyzer 133, semantic information of the type information of the data fields analyzed by the field type analyzer 134, and semantic information of the range of the value recorded in each data field analyzed by the value range analyzer 135 with reference to the table.

Figure 13:
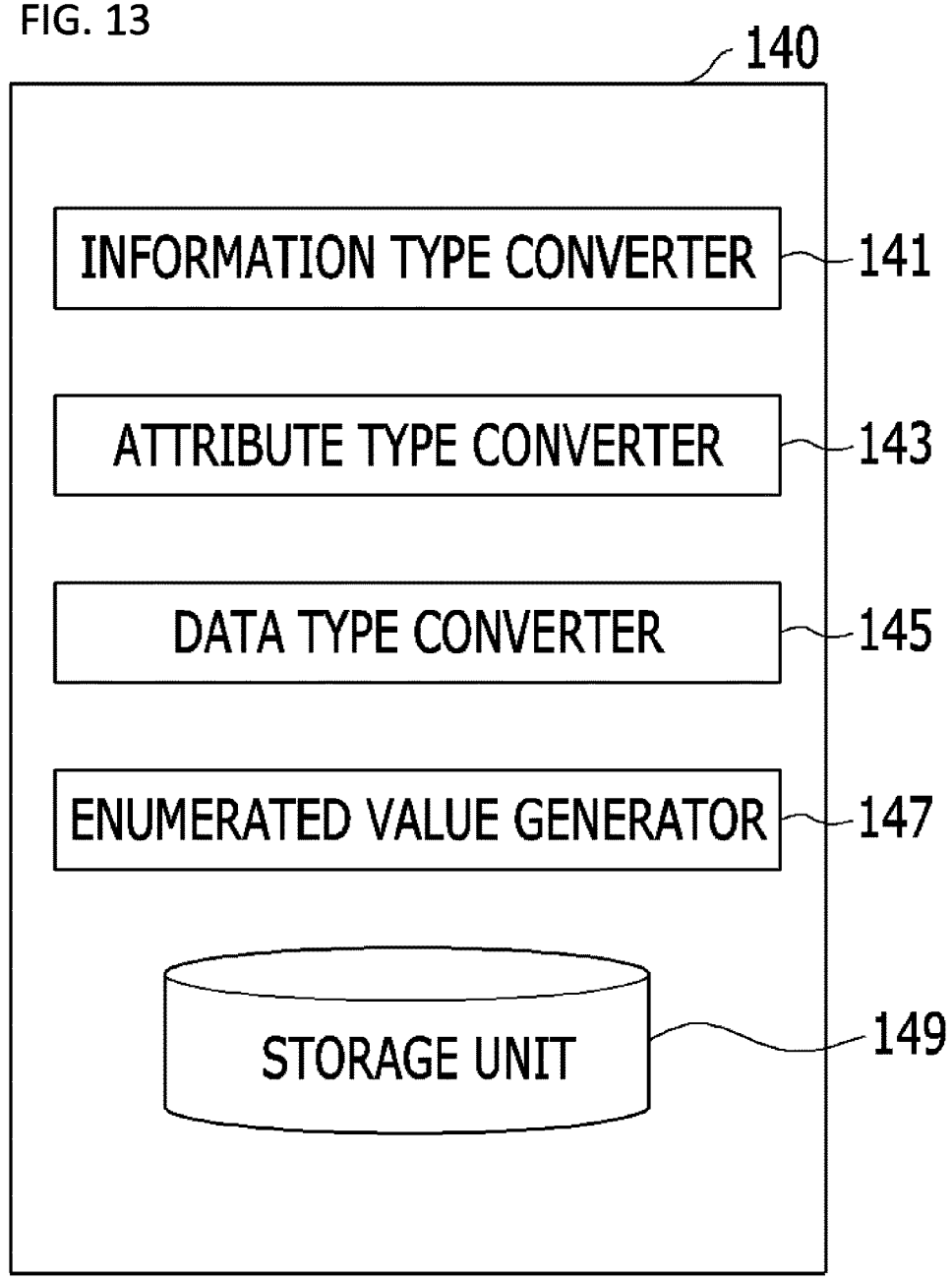
FIG. 13 is a block diagram schematically illustrating an internal configuration of a converter illustrated in FIG. 11.

FIG. 13 is a block diagram schematically illustrating an internal configuration of the converter 140 illustrated in FIG. 11.

Referring to FIG. 13, the converter 140 may include an information type converter 141, an attribute type converter 143, a data type converter 145, an enumerated value generator 147, and a storage unit 149, for converting the IEC 61162-based sentence to a CMDS.

The information type converter 141 may convert the sentence format (30 of FIG. 1) analyzed by the address field analyzer 131 and the semantic information of the sentence format analyzed by the semantic analyzer 136 into an information type object of the CMDS according to the converting rule stored in the storage unit 149. Here, the information type object may include a class item and a name item of the class illustrated in FIGS. 5, 8 and 10.

The attribute type converter 143 may convert the tag information tagged to the data fields analyzed by the data tag analyzer 132 and the semantic information of the tag information analyzed by the semantic analyzer 136 into attribute type objects of the CMDS according to the converting rule stored in the storage unit 149. Here, the attribute type may include an attribute item and a literal item illustrated in FIGS. 5, 8 and 10.

The data type converter 145 may convert the type information of the data fields analyzed by the field type analyzer 134, the symbol character analyzed by the symbol analyzer 133, the value range analyzed by the value range analyzer 135, the semantic information of the type information of the data fields analyzed by the semantic analyzer 136 into data type objects of the CMDS according to the converting rule stored in the storage unit 149.

The enumerated value generator 147 may convert the value range, recorded in the data fields of the IEC 61162-based sentence, into an enumerated data type (an enumerated value type) object defined in the complex types of the CMDS to generate the enumerated value type object according to the converting rule stored in the storage unit 149.

The storage unit 149 may store the converting rule that defines an association between the information type of the CMDS and the sentence format analyzed by the address field analyzer 131, an association between the attribute type of the CMDS and the tag information tagged to the data fields analyzed by the data tag analyzer 132, and an association between the data types of the CMDS and a result of analysis by each of the symbol analyzer 133, the field type analyzer 134, and the value range analyzer 135.

FIG. 14 is a flowchart of a ship information conversion method according to an embodiment of the present invention. Details repetitive of the details described above with reference to FIGS. 11 to 13 will be briefly described below.

Referring to FIG. 14, first, an operation of receiving an IEC 61162-based sentence may be performed in step S110.

Subsequently, an operation of recognizing the IEC 61162-based sentence may be performed in step S120. In detail, a syntax pattern which includes address fields distinguished in the IEC 61162-based sentence, tag information tagged to the data fields, data types of the data fields, a value range recorded in the data fields, and a symbol character may be recognized while scanning the IEC 61162-based sentence in a direction from the right to the left or a direction from the left to the right according to a parsing algorithm.

Subsequently, an operation of analyzing the IEC 61162-based sentence may be performed in step S130.

In detail, the recognized address field, tag information tagged to the data fields, data types of the data fields, value range recorded in the data fields, and symbol character, and semantic information thereof may be analyzed by using a table which defines a coupling relationship or an association between at least two of a sentence format (S.F), types of the data fields, the tag information tagged to the data field, a symbol, and semantic information thereof.

Subsequently, an operation of converting the IEC 61162-based sentence into a CMDS may be performed in step S140.

In detail, an information type object, an attribute type object, and an enumerated value type object may be extracted, and the CMDS including the extracted information type object, attribute type object, and enumerated value type object may be generated with reference to the converting rule that defines an association between the information type of the CMDS and the sentence format analyzed by the address field analyzer 131, an association between the attribute type of the CMDS and the tag information tagged to the data fields analyzed by the data tag analyzer 132, and an association between the data types of the CMDS and a result of analysis by each of the symbol analyzer 133, the field type analyzer 134, and the value range analyzer 135.

According to the embodiments of the present invention, message information (for example, a device status, control information, and/or the like) applied to conventional ship sailing devices may be used to be compatible with data of a ship's integration system or a land management system. That is, information may be converted into a structure enabling the use of data in terms of system integration/cooperation instead of the conventional use of data based on a device unit.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A ship information conversion method comprising:
   (A) receiving an international electrotechnical commission (IEC) 61162-based sentence prescribed by IEC;
   (B) analyzing an address field and a data field of the IEC 61162-based sentence; and
   (C) extracting an information type object, an attribute type, a data type object, and an enumerated data type object from the IEC 61162-based sentence and converting the IEC 61162-based sentence into a common maritime data structure (CMDS) by using a result of the analysis which is performed in step (B), the CMDS including the extracted information type object, attribute type, data type object, and enumerated data type object.

2. The ship information conversion method of claim 1, wherein step (C) comprises extracting the information type object from the IEC 61162-based sentence by using a sentence formatter of the address field analyzed in step (B) and semantic information of the sentence.

3. The ship information conversion method of claim 2, wherein the extracting of the information type object comprises extracting the information type object which includes a class item and a name item of the class.

4. The ship information conversion method of claim 3, wherein the extracting of the information type object comprises converting the sentence formatter or the semantic information of the sentence into a name item of the class to extract the information type object.

5. The ship information conversion method of claim 1, wherein step (C) comprises extracting the attribute type from the IEC 61162-based sentence by using tag information tagged to the data field analyzed in step (B) and semantic information of the tag information.

6. The ship information conversion method of claim 5, wherein the extracting of the attribute type comprises converting the tag information into an attribute item to extract the attribute type.

7. The ship information conversion method of claim 1, wherein step (C) comprises extracting the data type object from the IEC 61162-based sentence by using type information of the data field, a symbol of the data field, a value range recorded in the data field, and semantic information thereof, which are analyzed in step (B).

8. The ship information conversion method of claim 1, wherein step (C) comprises:
   converting a value, having a value range among values recorded in the data field analyzed in step (B), into an enumerated data type object prescribed in the CMDS; and
   extracting the enumerated data type object.

9. A ship information conversion device comprising:
   an input unit configured to receive an international electrotechnical commission (IEC) 61162-based sentence prescribed by IEC;
   an analyzer configured to analyze an address field and a data field of the IEC 61162-based sentence; and
   a converter configured to extract an information type object, an attribute type, a data type object, and an enumerated data type object from the IEC 61162-based sentence and convert the IEC 61162-based sentence into a common maritime data structure (CMDS) by using a result of the analysis by the analyzer, the CMDS including the extracted information type object, attribute type, data type object, and enumerated data type object.

10. The ship information conversion device of claim 9, wherein the converter extracts the information type object from the IEC 61162-based sentence by using a sentence formatter of the address field analyzed by the analyzer and semantic information of the sentence.

11. The ship information conversion device of claim 10, wherein the converter extracts the information type object which includes a class item and a name item of the class.

12. The ship information conversion device of claim 11, wherein the converter converts the sentence formatter into a name item of the class to extract the information type object.

13. The ship information conversion device of claim 9, wherein the converter extracts the attribute type from the IEC 61162-based sentence by using tag information tagged to the data field analyzed by the analyzer and semantic information of the tag information.

14. The ship information conversion device of claim 9, wherein the converter extracts the data type object from the IEC 61162-based sentence by using type information of the data field, a symbol of the data field, a value range recorded in the data field, and semantic information thereof, which are analyzed by the analyzer.

15. The ship information conversion device of claim 9, wherein the converter converts a value, having a value range among values recorded in the data field analyzed by the analyzer, into an enumerated data type prescribed in the CMDS to further extract the enumerated data type object, and converts the IEC 61162-based sentence into the CMDS which includes the information type object, the attribute type, the data type object, and the enumerated data type object.

* * * * *